US006867896B2

(12) United States Patent
Miles

(10) Patent No.: US 6,867,896 B2
(45) Date of Patent: Mar. 15, 2005

(54) INTERFEROMETRIC MODULATION OF RADIATION

(75) Inventor: Mark W. Miles, Boston, MA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 09/966,843

(22) Filed: Sep. 28, 2001

(65) Prior Publication Data

US 2002/0015215 A1 Feb. 7, 2002

Related U.S. Application Data

(60) Division of application No. 09/056,975, filed on Apr. 8, 1998, which is a continuation-in-part of application No. 08/769,947, filed on Dec. 19, 1996, now abandoned, which is a continuation-in-part of application No. 08/554,630, filed on Nov. 6, 1995, now abandoned, which is a continuation-in-part of application No. 08/238,750, filed on May 5, 1994, now Pat. No. 5,835,255.

(51) Int. Cl.[7] ............................................. G02B 26/00
(52) U.S. Cl. ....................................... 359/290; 359/291
(58) Field of Search ................................. 359/290, 291, 359/292, 295, 298

(56) References Cited

U.S. PATENT DOCUMENTS

| 2,534,846 A | 12/1950 | Ambrose et al. |
|---|---|---|
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,813,265 A | 5/1974 | Marks |
| 3,955,880 A | 5/1976 | Lierke |
| 4,099,854 A | 7/1978 | Decker et al. |
| 4,228,437 A | 10/1980 | Shelton |
| 4,377,324 A | 3/1983 | Durand et al. |
| 4,389,096 A | 6/1983 | Hori et al. |

(List continued on next page.)

FOREIGN PATENT DOCUMENTS

| EP | 0667548 A1 | 8/1995 |
|---|---|---|
| JP | 405275401 A1 | 10/1993 |
| WO | WO 9530924 | 11/1995 |

OTHER PUBLICATIONS

Winters, et al. *The etching of silicon with $XeF_2$ vapor*. Applied Physics Letters, vol. 34, No. 1, Jan. 1979, pp. 70–73.

Ibotson, et al. *Comparison of $XeF_2$ and F–atom reactions with Si and $SiO_2$*. Applied Physics Letters, vol. 44, No. 12, Jun. 1984, pp. 1129–1131.

Williams, et al. *Etch Rates for Micromatching Processing*. Journal of Microelectromechanical Systems, vol. 5, No. 4, Dec. 1996, pp. 256–269.

Schnakenberg, et al. *Tmahw Etchants for Silicon Micromachining*. 1991 International Conference on Solid State Sensors and Actuators—Digest of Technical Papers. Pp. 815–818.

"Light Over Matters," Jun. 1993, Circle No. 36.

Akasaka, "Three–Dimensional IC Trends," Proceedings of IEEE, vol. 74, No. 12, Dec. 1986, pp. 1703–1714.

(List continued on next page.)

*Primary Examiner*—Scott J. Sugarman
*Assistant Examiner*—Richard Hanig
(74) *Attorney, Agent, or Firm*—Knobbe Martens Olson & Bear LLP

(57) ABSTRACT

In one embodiment the invention provides an interferometric modulator comprising a cavity defined by two walls held by a support. The support comprises two materials such that the electrical or mechanical properties of the mechanical support differ at different locations in a cross-section of the mechanical support.

19 Claims, 15 Drawing Sheets

U.S. PATENT DOCUMENTS

| | | |
|---|---|---|
| 4,403,248 A | 9/1983 | Te Velde |
| 4,445,050 A | 4/1984 | Marks |
| 4,459,182 A | 7/1984 | te Velde |
| 4,519,676 A | 5/1985 | te Velde |
| 4,531,126 A | 7/1985 | Sadones |
| 4,663,083 A | 5/1987 | Marks |
| 4,681,403 A | 7/1987 | Te Velde et al. |
| 4,748,366 A | 5/1988 | Taylor |
| 4,786,128 A * | 11/1988 | Birnbach ............... 378/85 |
| 4,790,635 A | 12/1988 | Apsley |
| 4,900,395 A | 2/1990 | Syverson et al. |
| 4,982,184 A | 1/1991 | Kirkwood |
| 5,022,745 A | 6/1991 | Zayhowski et al. |
| 5,044,736 A | 9/1991 | Jaskie et al. |
| 5,075,796 A | 12/1991 | Schildkraut et al. |
| 5,078,479 A | 1/1992 | Vuilleumier |
| 5,124,834 A | 6/1992 | Cusano et al. |
| 5,142,414 A | 8/1992 | Koehler |
| 5,153,771 A | 10/1992 | Link et al. |
| 5,168,406 A | 12/1992 | Nelson |
| 5,228,013 A | 7/1993 | Bik |
| 5,231,532 A | 7/1993 | Magel et al. |
| 5,233,459 A | 8/1993 | Bozler et al. |
| 5,293,272 A | 3/1994 | Jannson et al. |
| 5,311,360 A | 5/1994 | Bloom et al. |
| 5,326,430 A | 7/1994 | Cronin et al. |
| 5,358,601 A | 10/1994 | Cathey |
| 5,381,253 A | 1/1995 | Sharp et al. |
| 5,401,983 A | 3/1995 | Jokerst et al. |
| 5,459,610 A | 10/1995 | Bloom et al. |
| 5,497,172 A | 3/1996 | Doherty et al. |
| 5,500,635 A | 3/1996 | Mott |
| 5,500,761 A | 3/1996 | Goossen et al. |
| 5,526,327 A | 6/1996 | Cordova, Jr. |
| 5,552,925 A | 9/1996 | Worley |
| 5,579,149 A | 11/1996 | Moret et al. |
| 5,619,059 A | 4/1997 | Li et al. |
| 5,629,790 A | 5/1997 | Neukermans et al. |
| 5,636,052 A | 6/1997 | Arney et al. |
| 5,636,185 A | 6/1997 | Brewer et al. |
| 5,673,139 A | 9/1997 | Johnson |
| 5,683,591 A | 11/1997 | Offenberg |
| 5,703,710 A | 12/1997 | Brinkman et al. |
| 5,710,656 A | 1/1998 | Goossen |
| 5,726,480 A | 3/1998 | Pister ............... 257/415 |
| 5,739,945 A | 4/1998 | Tayebati |
| 5,784,190 A | 7/1998 | Worley |
| 5,793,504 A * | 8/1998 | Stoll ............... 359/11 |
| 5,808,780 A * | 9/1998 | McDonald ............... 359/290 |
| 5,825,528 A | 10/1998 | Goossen |
| 5,835,255 A | 11/1998 | Miles |
| 5,943,158 A * | 8/1999 | Ford et al. ............... 359/295 |
| 6,055,090 A * | 4/2000 | Miles ............... 359/291 |
| 6,100,872 A | 8/2000 | Aratani et al. |
| 6,243,149 B1 * | 6/2001 | Swanson et al. ............... 349/62 |

OTHER PUBLICATIONS

Aratani, et al., "Process and Design Considerations for Surface Micromachined Beams for a Tuneable Interferometer Array in Silicon," Proc. IEEE, Microelectromechanical Workshop, Ft. Lauderdale, FL, Feb. 7–10, 1993, p. 230, et. seq.

Aratani, K. et al. "Surface micromachined tuneable interferometer array," *Sensors and Actuators*, 1994, pp. 17–23.

Conner, "Hybrid Color Display Using Optical Interference Filter Array," SID Digest, 1993, pp. 577–580.

Goosen, et al., "Possible Display Applications of the Silicon Mechanical Anti–Reflection Switch," Society for Information Display, 1994.

Goosen, et al., "Silicon Modulator Based on Mechanically–Active Anti–Reflection Layer with One M Bit/Sec Capability for Fiber–in–the–Loop Applications," IEEE, Photonic Technology Letters, Sep. 1994.

Gosch, "West Germany Graps the Lead in X–Ray Lithography," *Electronics*, Feb. 5, 1987, pp. 78–80.

Howard, "Nanometer–Scale Fabrication Techniques," *VLSI Electronics: Microstructure Science*, vol. 5 1982, pp. 145–153, pp. 166–173.

Ibotson, et al. Comparison of XeF2, and F–atom reactions with Si and siO2, Applied Physics Letters. vol. 44, No. 12, Jun. 1984. pp. 1129–1131.

Jackson, "Classical Electrodynamics," John Wiley & Sons, Inc., pp. 568–573.

Jerman, et al., "A Miniature Fabry–Perot Interferometer with a Corrugated Silicon Diaphram Support," Sensors and Actuators A, 1991, vol. 29, p. 151.

Johnson, "Optical Scanners." Microwave Scanning Antennas, vol. 1 p. 251 et seq.

Miles, Mark, W., "A New Reflective FPD Technology Using Interferometric Modulation," Society for Information Display '97 Digetst, Session 7.3.

Newsbreak, "Quantum–trench devices might operate at terahertz frequencies," Laser Focus World May 1993.

Oliner, "Radiating Elements and Mutual Coupling." *Microwave Scanning Antennas*, vol. 2, p. 131 et seq.

Raley, et al., "A Febry–Perot Microferometer for Visible Wave Lengths," IEEE Solid–State Sensor and Actuator Workshop, Jun. 1992, Hilton Head, SC.

Schnakenberg, et al. Tmahw Etchants for Silicon Micromachining. 1991 International Conference on Solid State Sensors and Actuators –Digest of Technical Papers. pp. 815–818.

Sperger, et al., "High Performance Patterned All–Dialectric Interference Colour Filter for Display Applications," SID Digest, 1994.

Stone, "Radiation and Optics, An Introduction to the Classical Theory," McGraw–Hill pp. 340–343.

Walker, et al., "Electron–Beam–Tunable Interference Filter Spatial Light Modulator," Optics Letters, vol. 13, No. 5, 1988, p. 345, et seq.

Williams, et al. Etch Rates for Micromachining Processing–Journal of Microelectromechanical Systems. vol. 5 No. 4, Dec. 1996, pp. 256–269.

Winters, et al., The etching of silicon with XeF2 vapor. Applied Physics Letters, vol. 34. No. 1, Jan. 1979, pp. 70–73.

Winton, John M., "A novel way to capture solar energy," chemical Week, May 15, 1985.

Wu, "Design of a Reflective Color LCD Using Optical Interference Reflectors," ASIA, Asia Display, Oct. 16, 1995, pp. 929–931.

* cited by examiner

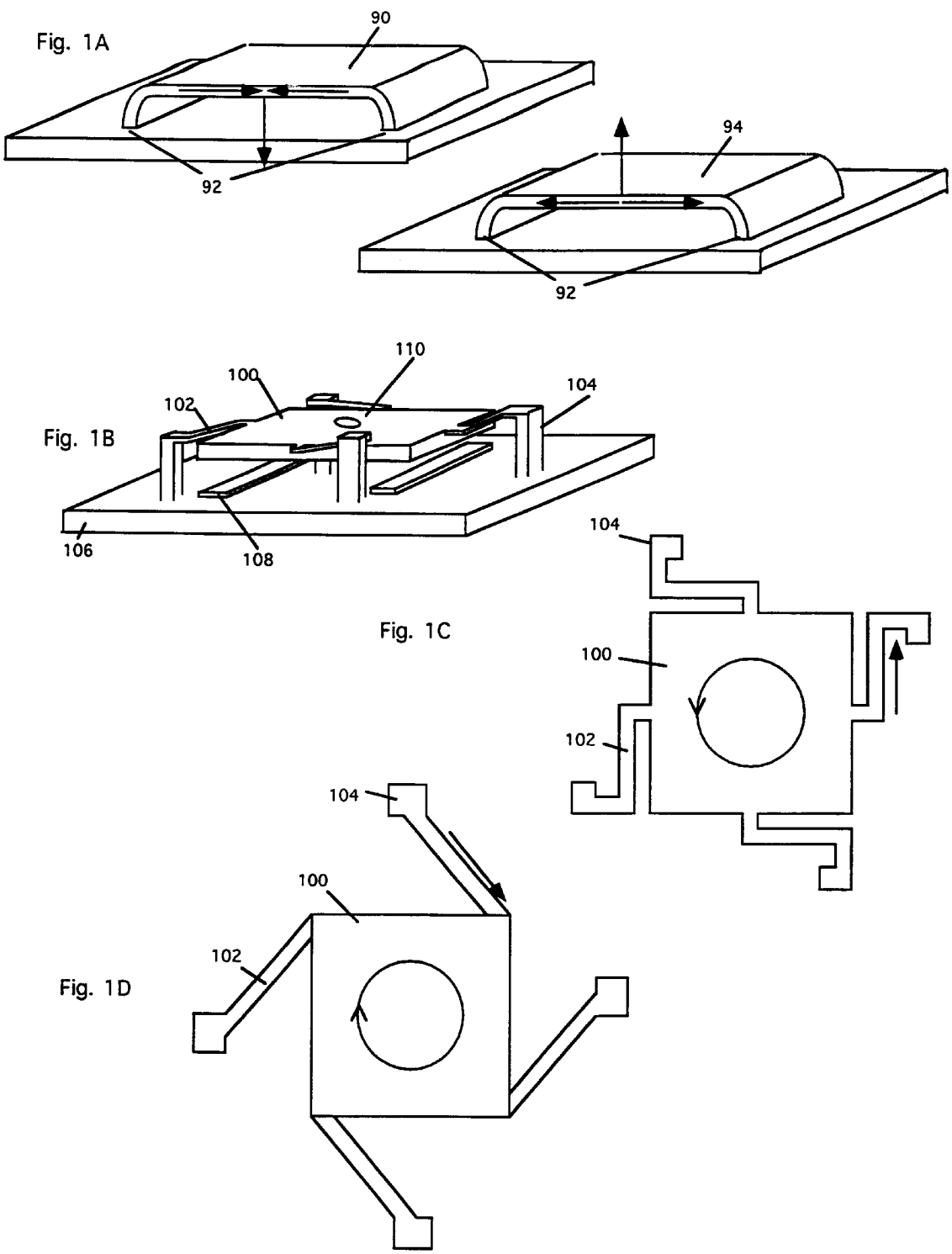

STATE 0    STATE 1    STATE 2

INTERFEROMETRIC MODULATION OF RADIATION

CROSS REFERENCE TO RELATED APPLICATIONS

This application is a divisional of U.S. application Ser. No. 09/056,975, filed Apr. 8, 1998 (now U.S. Pat. No. 6,674,562), which is a continuation in part of U.S. patent applications Ser. Nos. 08/238,750 (now U.S. Pat. No. 5,835,255), 08/554,630 (now abandoned), and 08/769,947, (now abandoned) filed May 5, 1994, Nov. 6, 1995, and Dec. 19, 1996 respectively, and incorporated by reference.

BACKGROUND

This invention relates to interferometric modulation.

Interference modulators (IMods) are a broad class of devices that modulate incident light by the manipulation of admittance via the modification of the device's interferometric characteristics. Applications for such devices include displays, optical processing, and optical information storage.

The parent application describes two kinds of structures whose impedance, the reciprocal of admittance, can be actively modified so that they can modulate light. One scheme is a deformable cavity whose optical properties can be altered by electrostatic deformation of one of the cavity walls. The composition and thickness of these walls, which consist of layers of dielectric, semiconductor, or metallic films, allows for a variety of modulator designs exhibiting different optical responses to applied voltages.

One such design includes a filter described as a hybrid filter which has a narrow bandpass filter and an induced absorber. When the wall associated with the hybrid filter is brought into contact with a reflector, incident light of a certain range is absorbed. This occurs because the induced absorber matches the impedance of the reflector to that of the incident medium for the range of frequencies passed by the narrow-band filter.

SUMMARY

In general, in one aspect, the invention features an interferometric modulator comprising a cavity defined by two walls. At least two arms connect the two walls to permit motion of the walls relative to each other. The two arms are configured and attached to a first one of the walls in a manner that enables mechanical stress in the first wall to be relieved by motion of the first wall essentially within the plane of the first wall.

Implementations of the invention may include one or more of the following features. The motion of the first wall may be rotational. Each of the arms has two ends, one of the ends attached to the first wall and a second end that is attached at a point that is fixed relative to a second one of the walls. The point of attachment of the second end is offset, with reference to an axis that is perpendicular to the first wall, from the end that is attached to the second wall. The first wall has two essentially straight edges and one end of each of the arms is attached at the middle of one of the edges or at the end of one of the edges. A third arm and a fourth arm also each connects the two walls. The arms define a pinwheel configuration. The lengths, thicknesses and positions of connection to the first wall of the arms may be configured to achieve a desired spring constant.

In general, in another aspect, the invention features an array of interferometric modulators. Each of the interferometric modulators has a cavity defined by two walls and at least two arms connecting the two walls to permit motion of the walls relative to each other. The walls and arms of different ones of the modulators are configured to achieve different spring constants associated with motion of the walls relative to each other.

In general, in another aspect, the invention features a method of fabricating an interferometric modulator, in which two walls of a cavity are formed, connected by at least two arms. After the forming, a first one of the walls is permitted to move in the plane of the first wall relative to the arms to relieve mechanical stress in the first wall.

In general, in another aspect, the invention features an interferometric modulator comprising three walls that are generally parallel to one another. The walls are supported for movement of at least one of the walls relative to the other two. Control circuitry drives at least one of the walls to discrete positions representing three discrete states of operation of the modulator.

Implementations of the invention may include one or more of the following features. In one of the three discrete states, there is a gap between the first and a second of the two walls and a gap between the second and a third of the two walls. In a second of the three discrete states, there is a gap between the first and the second of the two walls and no gap between the second and the third of the two walls. In the third of the three discrete states, there is no gap between the first and the second of the two walls and no gap between the second and the third of the two walls. Each membrane includes a combination of dielectric, metallic, or semiconducting films.

In general, in another aspect, an interference modulator includes a cavity defined by two walls that are movable relative to one another to and from a contact position in which the two walls are essentially adjacent to one another. Spacers are mounted to form part of one of the walls to reduce the surface area over which the two walls touch in the contact position.

Implementations of the invention may include one or more of the following features. The spacers comprise electrodes and conductors feed current to the electrodes.

In general, in another aspect, the invention features an interference modulator comprising a cavity defined by two walls that are separated by a fluid-filled gap. The walls are movable relative to each other to change the volume of the gap. An aperture (e.g., a round hole in the center) in one of the walls is configured to control the damping effect of fluid moving into or out of the gap as the volume of the gap changes. In implementations of the invention, the aperture comprises a round hole in the center of the wall.

In general, in another aspect, the invention features an interference modulator comprising at least two walls that are movable relative to each other to define a cavity between them. The relative positions of the walls define two modes, one in which the modulator reflects incident light and appears white and another in which the modulator absorbs incident light and appears black. In implementations, one of the walls may include a sandwich of a dielectric between metals, and the other of the walls may comprise a dielectric.

In general, in another aspect, the invention features an interferometric modulator comprising a cavity defined by two walls with at least two arms connecting the two walls to permit motion of the walls relative to each other. The response time of the modulator is controlled to a predetermined value by a combination of at least two of: the lengths of the arms, the thickness of one of the walls, the thickness of the arms, the presence and dimensions of damping holes, and the ambient gas pressure in the vicinity of the modulator.

In general, in another aspect, the invention features an interferometric modulator comprising a cavity defined by two walls, at least two arms connecting the two walls to permit motion of the walls relative to each. The modulator includes a charge deposition mitigating device includes at least one of actuation rails or the application of alternating polarity drive voltages.

In general, in another aspect, the invention features an interferometric modulator comprising a cavity defined by two walls held by a support comprising two materials such that the electrical or mechanical properties of the mechanical support differ at different locations in a cross-section of the mechanical support.

Implementations of the invention may include one or more of the following features. The support may include a laminate of two or more discrete materials or a gradient of two or more materials. The two materials exhibit respectively different and complementary electrical, mechanical, or optical properties.

In general, in another aspect, the invention features, a method for use in fabricating a microelectromechanical structure, comprising using a gas phase etchant to remove a deposited sacrificial layer. In implementations of the invention, the MEMS may include an interference modulator in which a wall of the modulator is formed on the substrate and the gas phase etchant may remove the sacrificial layer from between the wall and the substrate. The gas phase etchant may include one of the following: XeF2, BrF3, ClF3, BrF5, or IF5.

In general, in another aspect, the invention features a method of making arrays of MEMS (e.g., interference modulators) on a production line. Electronic features are formed on a surface of a glass or plastic substrate that is at least as large as 14"×16", and electromechanical structures are micromachined on the substrate. In implementations of the invention, the steps of forming the electronic features overlap (or do not overlap) with steps of micromachining the structures.

Other advantages and features will become apparent from the following description and from the claims.

BRIEF DESCRIPTION OF THE DRAWINGS

FIG. 1A is a perspective view of a double clamped IMod.

FIG. 1B is a perspective view of an IMod with pinwheel tethers and a damping hole.

FIG. 1C is a top view of an IMod with pinwheel tethers and a damping hole.

FIG. 1D is a top view of an IMod with straight tethers.

DETAILED DESCRIPTION

Figure 2A:
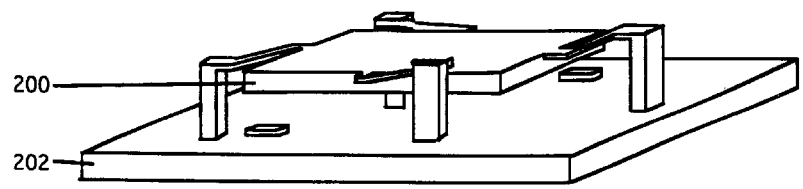
FIG. 2A shows a perspective view of a black and white IMod.

The optical impedance, the reciprocal of admittance, of an IMod can be actively modified so that it can modulate light.

One way of doing this (some aspects of which are described in U.S. patent applications Ser. No. 08/238,750 filed May 5, 1994 now U.S. Pat. No. 5,835,255, and incorporated by reference) is by a deformable cavity whose optical properties can be altered by deformation, electrostatically or otherwise, of one or both of the cavity walls. The composition and thickness of these walls, which comprise layers of dielectric, semiconductor, or metallic films, allow for a variety of modulator designs exhibiting different optical responses to applied voltages. This scheme can be considered a form of microelectromechanical structure/system (MEMS).

Another way of actively modifying the impedance of an IMod (some aspects of which are described in U.S. patent application Ser. No. 08/554,630, filed Nov. 6, 1995, and incorporated by reference) relies on an induced absorber to regulate the optical response. Such an IMod may operate in reflective mode and can be fabricated simply and on a variety of substrates.

Both the deformable and induced absorber schemes typically work in a binary mode, residing in one of two states, or an analog or tunable mode, residing in one of a continuous range of states. The difference between these two modes is based primarily on the mechanical design of the IMod structure.

Some applications could use a multi-state IMod that can reside in more than two states based on its mechanics and structure. A multi-state IMod can offer several advantages from both an optical performance and digital driving perspective.

Structural components in MEMS may exhibit residual film stress, the tendency of a deposited film, say of aluminum, to either shrink and crack (tensile stress) or push outward and buckle (compressive stress). A variety of factors contribute to the nature and magnitude of this stress. They include parameters of the deposition process as well as the temperature of the substrate during the deposition.

Control of this stress determines, in part, the forces required to actuate the structures as well as the final shapes of the structures. For example, a self-supporting membrane with very high residual stress may require prohibitively high driving voltages to actuate. The same membrane also may twist or warp due to these forces.

Actuation voltage, electromechanical behavior, and final shape are important characteristics of IMods. Some device applications exploit the electromechanical properties. Large area displays, for example, can take advantage of the inherent hysteresis of these structures in order to provide "memory" at the pixel location. However this requires that the IMods in a given array behave in a nearly identical fashion. Since their behavior is determined by the mechanical properties of the materials, among them residual stress, the films must be deposited with great consistency over the area of the display. This is not always readily attainable.

FIG. 1A is an illustration of one IMod structural design, which has been discussed in previous patent applications. This design can be described as a "double clamped" beam in that it consists of a self-supporting beam 90 which is supported, or clamped, on both ends 92. When this structure is subject to residual stress, the height of the membrane (the beam) can increase or decrease depending on whether the stress is compressive or tensile respectively. In FIG. 1A, membrane 90 is shown in a state of tensile stress, which causes the membrane to shrink in area. Because the structure is bound to the substrate at points 92, the membrane height is decreased due to this shrinkage. Conversely membrane 94, shown in compressive stress, attempts to expand with the end result being a net increase or decrease in height or overall bowing of the structure.

FIG. 1B shows an improvement to this design. In this case, the movable secondary mirror 100 is connected to support posts 104 via tethers 102. The IMod is fabricated on substrate 106, and incorporates stiction bumps 108. The structure has advantages with respect to residual stress. In particular, because tethers 102 are tangential to secondary mirror 100, residual stress in the material will have a tendency to be relieved by causing the mirror 100 to twist in a clockwise direction or counter clockwise direction if the stress is compressive or tensile.

This twist is illustrated for a tensile case in FIG. 1C. Because a tensile film has a tendency to shrink, the sides of secondary mirror 100 are pulled towards the support posts 104 with which they are associated, while the mirror remains in its original plane. The twisting relieves the residual stress of the structure. This stress relief occurs after the last step of the IMod fabrication when a supporting sacrificial spacer is removed from beneath the structure. Depending on the overall design of the IMod, a certain amount of structural rotation can be tolerated. Consequently, minute variations of residual stress across the expanse of a display array are mitigated or eliminated because each IMod rotates to its individual stress relieved position, all without affecting the optical properties.

The other consequence of this relief is that stress no longer contributes, or contributes much less, to the electromechanical behavior of the device. Device characteristics such as voltage and resonant frequency are thus determined primarily by factors such as modulus of elasticity and film thickness. Both of these characteristics are more easily controlled during deposition.

FIG. 1D illustrates another geometry for a stress relieving structure relying on straight tethers 102. In this case, the mirror is rotating clockwise to relieve compressive stress. Other tether configurations, including curved or folded, are also possible, Referring again to FIG. 1B, a micro-electromechanical structure has a tendency to stick to a surface of a substrate that it touches during operation. Structures that minimize the area of contact between movable membrane 100 and the substrate can mitigate this phenomenon. Stiction bumps 108 can provide this mechanism by acting as supports which contact the membrane only over a relatively small area. These structures can be fabricated using the micromachining techniques described in the previous patent applications. They can also act as bottom electrodes if suitably insulated, and exhibit certain advantages over previously described designs, which will be discussed below. In this role they may be referred to as actuation rails. These structures may also be fabricated on the movable membrane.

Referring again to FIG. 1B, damping hole 110 also enhances the performance of this structure. When the membrane is actuated i.e., pulled downward, the air between it and the substrate must be displaced. The same volume of air must be replaced when the membrane is allowed to deflect back to its quiescent position. The energy required to move this volume of air has the effect of slowing the motion of the membrane or damping its behavior. Damping is both a detriment and an advantage. Minimizing the response time of these devices is important in order to support the necessary display data rates, thus the desire exists to minimize damping. However it is also important to bring the membrane to fixed position very quickly in order to reduce the amount of light reflected, over time, which is not of the desired color. With insufficient damping, such a membrane can experience ringing, or decaying oscillation, when it is released into the undriven state. This should be minimized, and is also determined in part by damping.

One method of optimizing damping is to provide a damping hole through the body of the membrane. The hole serves to provide a supplementary path for the air during the motion of the membrane. The force required to displace and replace the air is thus lessened, and the effect of damping reduced. Thus choosing the size of the hole during manufacture provides a mechanism for manipulating the amount of damping the IMod experiences, and therefore its response time. Stiction bumps, 108, can also assist in minimizing damping. They do so by maintaining a finite distance between the membrane and substrate so that there is a path for airflow, between the membrane and the substrate, when the membrane is fully actuated.

Another method for optimizing damping relies on control of the ambient gas pressure. Any IMod device, as described in previous patent applications, will be packaged in a container that provides a hermetic seal, using an inert gas. This prevents the introduction of both particulate contaminants as well as water vapor, both of which can degrade the performance of the IMod over time. The pressure of this gas has a direct bearing on the amount of damping that the packaged devices will experience. Thus, the damping, and response time, may also be optimized by determining the ambient gas pressure within the packaging during manufacture.

A key metric of performance in a reflective flat panel display is its brightness. Most of these displays achieve color spatially, that is each pixel is divided into three sub-pixels corresponding to the colors red, blue, and green. White is achieved by maximizing the brightness of all three sub-pixels. Unfortunately, since each sub-pixel utilizes only about 1/3 of the light incident upon it, the overall brightness of the white state can be low.

This can be resolved by utilizing a sub-pixel structure that is capable of directly achieving a white state, in addition to a particular color. In this fashion, the overall brightness of the display can be increased because a sub-pixel in a white state utilizes a significantly higher fraction of the light incident upon it. The IMod design described in patent application Ser. No. 08/554,630 is capable of reflecting either a particular color or exhibiting a "black" or absorbing state. This design can be modified to include alternative states.

Figure 2B:
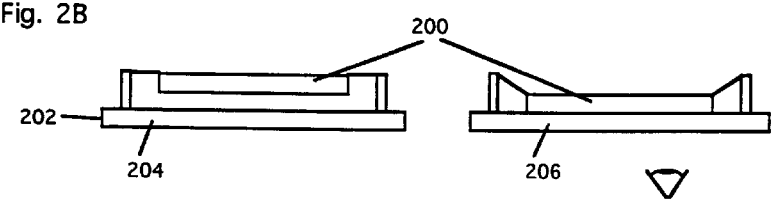
FIG. 2B shows a side view of the IMod in two states.

FIG. 2A shows a perspective view of an arrangement that is capable of a black state and a white state, and illustrates the previously described tether configuration. (The double-clamped membrane of FIG. 1A is also a usable mechanical design though with the mentioned sensitivities to stress.) FIG. 2B shows the IMod in the two states with 204 being the undriven state, and 206 being the driven state. In the driven state the IMod absorbs incident light and appears black to a viewer looking through substrate 202. In the undriven state, the IMod appears white.

Figure 2C:
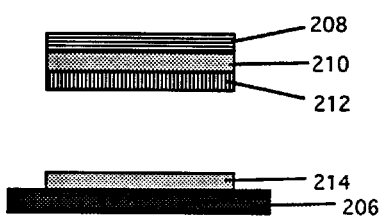
FIG. 2C illustrates the thin film structure of the IMod.
Figure 2D:
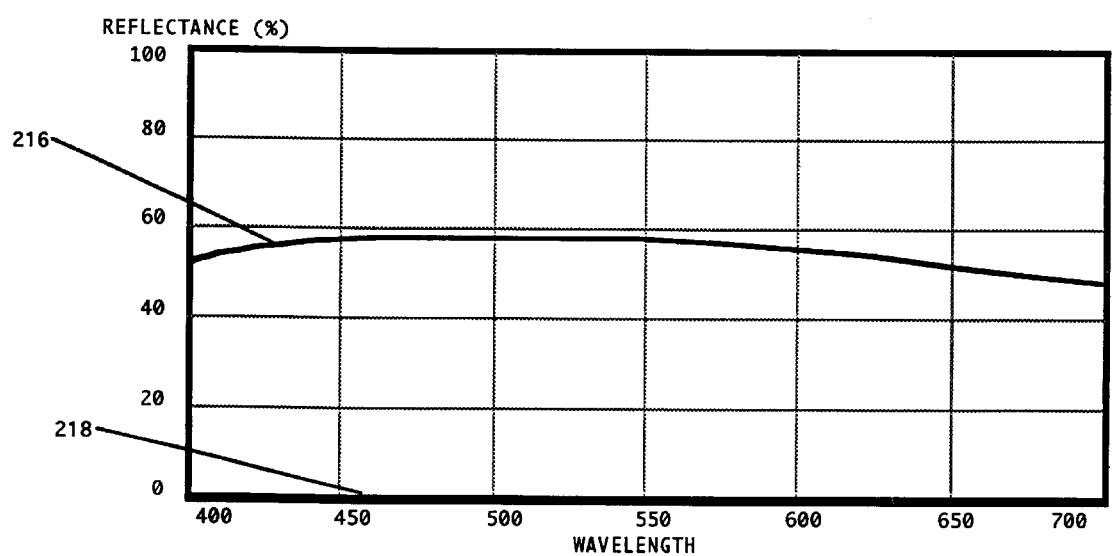
FIG. 2D shows the spectral reflectance function of the IMod in its two states.

FIG. 2C reveals details of the films involved. Movable membranes 208, 210, and 212, comprise three films of a metal, a dielectric, and a metal, respectively. One example could utilize aluminum of 400 nanometers (nm) thick for metal 208, silicon dioxide of 50 nm for dielectric 210, and tungsten of 14.9 nm for metal 212. Dielectric 214 could comprise a film of zirconium dioxide 54.36 nm thick, residing on substrate 26. FIG. 2D illustrates the spectral reflectance function of this IMod design in the two states. Curves 216 and 218 reveal the reflectivity of the IMod in the white state and the black state, respectively.

Figure 3A:
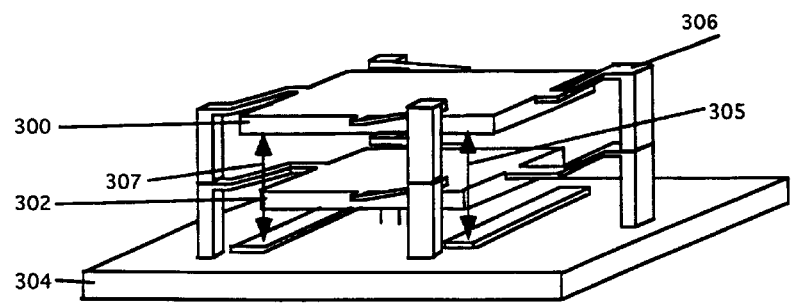
FIG. 3A shows a perspective view of a multi-state IMod.
Figure 3B:
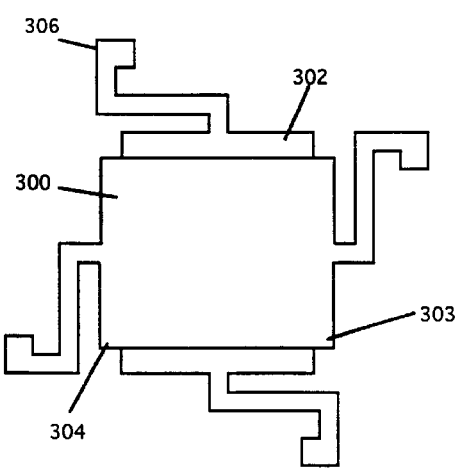
FIG. 3B shows a top view.

FIG. 3A is a variation that is capable of three states. In this design, the thin film stack of the design in FIG. 2A has been broken into separate movable membranes. Membrane 300 is a metal, 400 nm of aluminum in this case, and membrane 302 is also a metal, 14 nm of tungsten for example. Because the tungsten is so thin, optically neutral structural films may be required to provide the requisite mechanical integrity, which could be in the form of a supporting frame. The air gap between the two membranes functions as the dielectric. FIG. 3B shows a top view of this IMod revealing detail of how actuation would occur. One complication of this design is that conducting membrane 302 shields membrane 300 from the electric fields produced by the stiction/actuation bumps. Lengthening membrane 300 at regions 303, 304 so that it extends beyond the footprint of A membrane 302 allows membrane 300 to "see" the electric fields via paths 305, 307 and thus be acted upon by them.

Figure 3C:
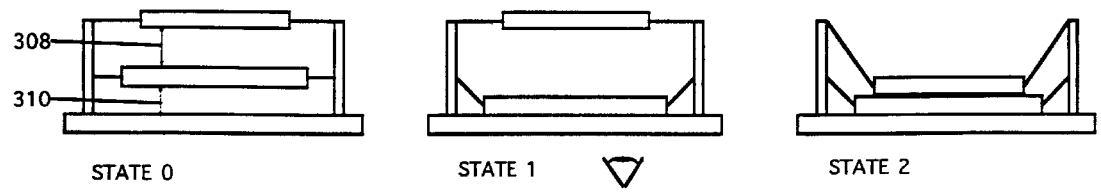
FIG. 3C shows a side view of the IMod in three states.
Figure 3D:
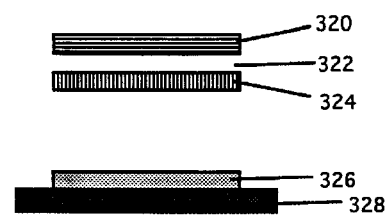
FIG. 3D illustrates the thin film structure of the IMod.
Figure 3E:
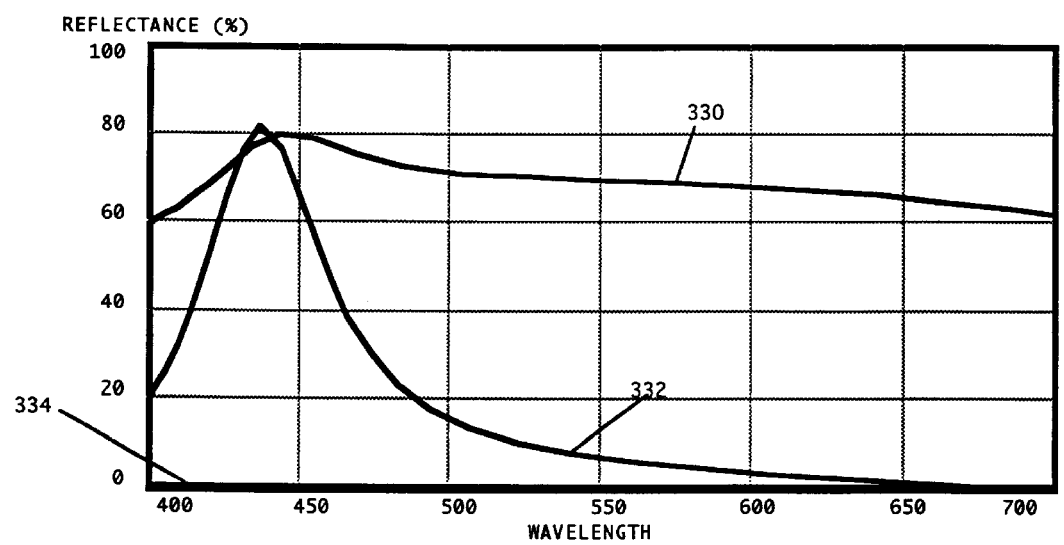
FIGS. 3E, 3F, and 3G show spectral reflectance functions of a green/white/black IMod, a red/white/black IMod, and a blue/white/black IMod, respectively.
Figure 3F:
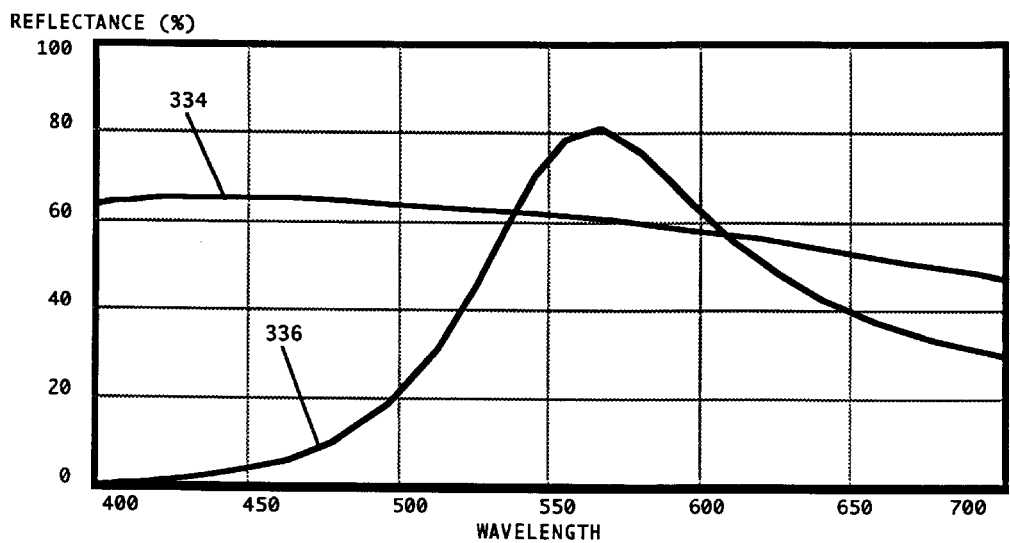
Figure 3G:
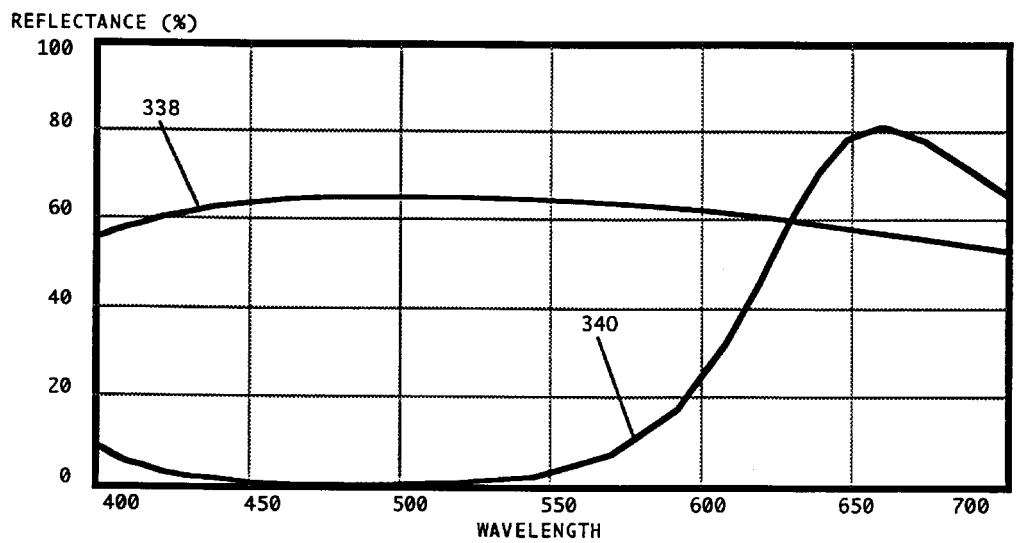

The three possible mechanical states, and associated dimensions, are illustrated in FIG. 3C. Airgap dimensions 308 and 310 could be 215 nm and 135 nm. FIG. 3D reveals detail of the thin films involved. Film 320 is a metal, 322 is an airgap which serves as a dielectric, 324 is also a metal, and 326 is a dielectric. FIG. 3E is a spectral reflectance plot of the three states. For the dimensions indicated, a black state (e.g. state 2), a blue state (state 0), and a white state (state 1) are possible, with the black, blue and white states corresponding to spectral reflectance plots, 334, 332, and 330. FIG. 3F shows plots for an IMod with green and white states 336 and 334, while FIG. 3G shows plots for an IMod with red and white states 340 and 338.

Like all IMods, this design exhibits electromechanical hysteresis, though it is more complicated than an IMod with only two states. There is a minimum voltage which, when applied, is sufficient to keep one or both membranes in a driven or actuated state despite the mechanical forces which seek to return them to their relaxed positions.

Figure 4A:
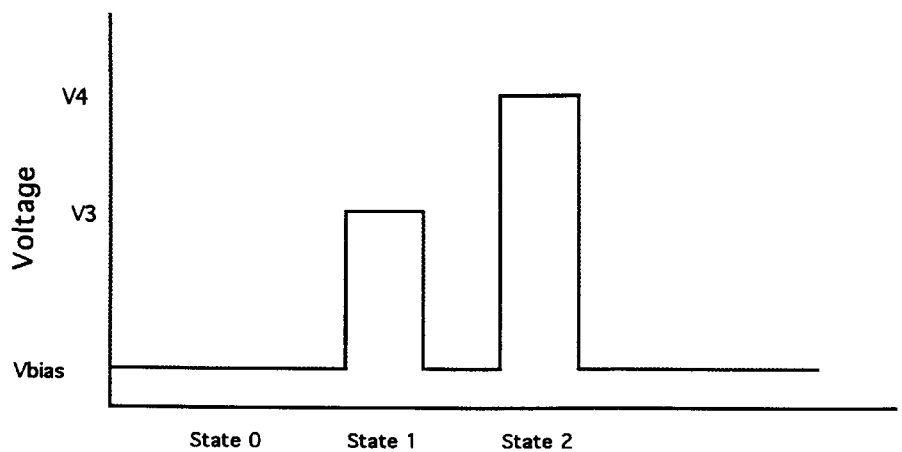
FIG. 4A shows the relationship between the multi-state IMod's states and the drive voltage.
Figure 4B:
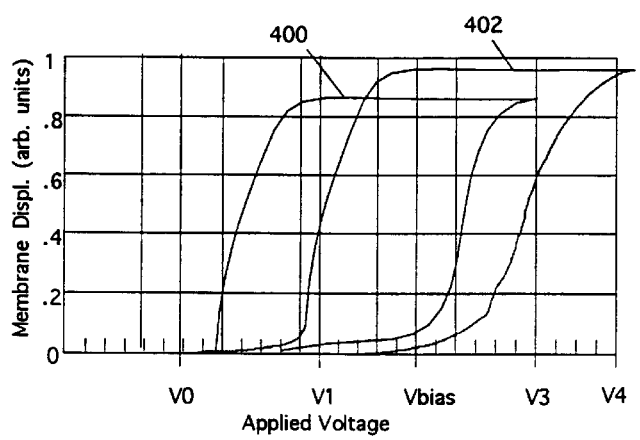
FIG. 4B shows the related electromechanical hysteresis curves.
Figure 4C:
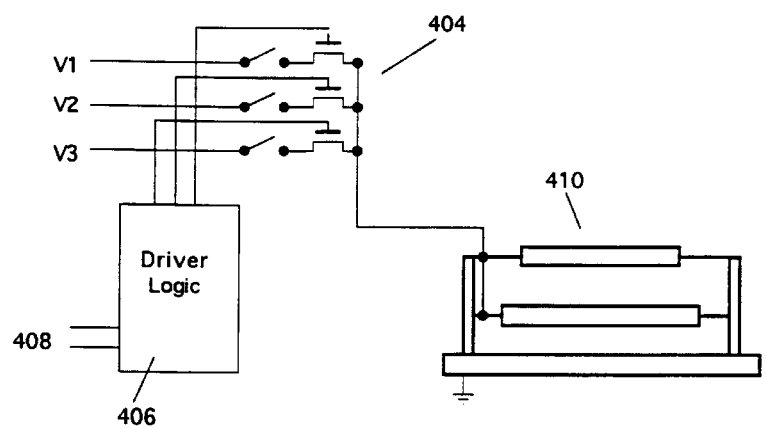
FIG. 4C illustrates part of a drive circuit to drive or actuate a device according to the multiple states of FIG. 4A.

FIG. 4A is a representative plot showing the relationship between applied voltage and the state of the IMod. A minimum bias, Vbias, is required to maintain the IMod in the state into which it has been driven. State 1 and State 2 are achieved by the application of voltages V3 and V4. The related hysteresis diagram is shown in FIG. 4B, with curve 400 corresponding to the electromechanical response of movable plate 302 of FIG. 3A, and curve 402 corresponding to that of movable plate 300. Vbias resides at the average of the centers of the two curves. FIG. 4C illustrates one part of a drive circuit required to actuate such a device. Output stage 406 consists of three transistors or other suitable switches that are connected in parallel to three different voltage sources, and the two movable plates of the IMod. Driver logic 404 responds to input signals 408 in a way that allows for the selection, via the output stage, of one particular voltage to be applied to the movable membranes of IMod 410. When no voltage is applied, the IMod's membranes move to their relaxed state via mechanical forces.

Figure 5A:
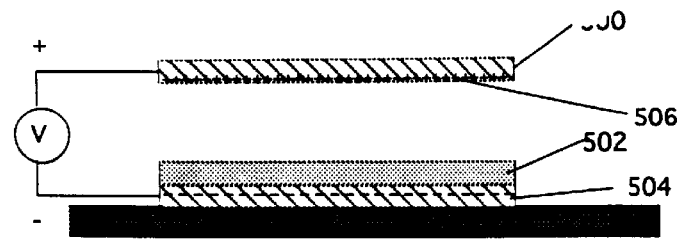
FIG. 5A shows an IMod, illustrating the effects of charge injection, in the undriven state.
Figure 5B:
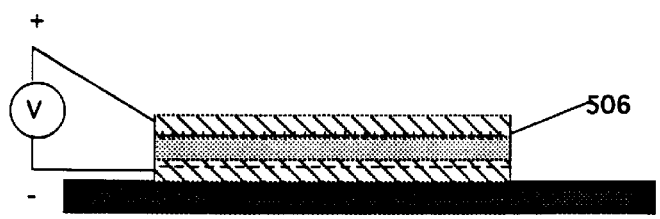
FIG. 5B shows the IMod driven.
Figure 5C:
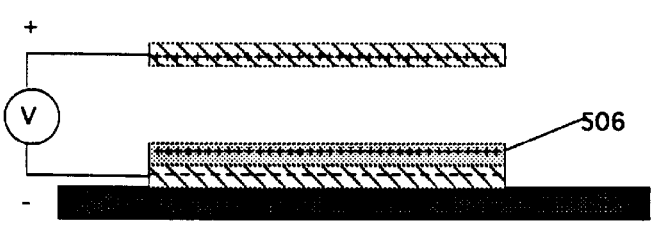
FIG. 5C shows the IMod undriven after charge transfer.

Another issue that can be encountered in movable membrane structures is that of charge deposition, a phenomenon illustrated in FIGS. 5A–5C. In FIG. 5A, a voltage is applied between movable plate 500 and fixed plate 504. Layer 502 is an insulating film that resides on top of fixed plate 504. If the applied voltage is sufficient to actuate the movable plate and it comes into contact with the insulator, as it does in FIG. 5B, it may deposit charge 506 on the insulator. One consequence of this is that the attractive force between plates 500 and 504 is reduced, and a higher voltage must be applied in order to achieve actuation (FIG. 5C).

Figure 5D:
FIG. 5D shows the IMod with reverse polarity applied.
Figure 5E:
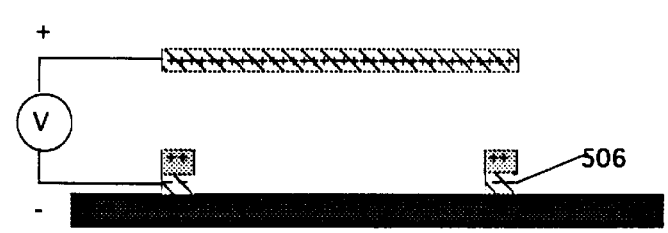
FIG. 5E shows the IMod shows a reduced area electrode configuration, which reduces the effects of charge injection, as well as providing a higher resistance to electrical shorts.

This condition can be resolved by applying alternating voltages to the structure. That is, for every intended actuation, change the polarity of the voltage that is applied such that the deposited charge is canceled out or actually exploited. FIG. 5D illustrates the effect of applying a reverse polarity. The other alternative is to eliminate the solid insulator and replace it with air. FIG. 5E illustrates the use of stiction bumps or actuation rails to accomplish this goal. Charge may still accumulate on these structures, but the area is much smaller, and therefore the accumulated charge is decreased. Reverse polarity and stiction bumps may also be used together.

Electrical shorts are another concern for these devices. Referring again to FIG. 5A, the surface area of both the movable membrane (top electrode) 500 and the bottom electrode 504 are equivalent. When the device is actuated (FIG. 5B), pinholes in the insulator, 502, could lead to electrical shorts and device failure. Utilizing a configuration like that shown in FIG. 5E can mitigate this issue by reducing the surface area of the surface electrode so that the probability of a short producing pinhole is reduced. The surface electrode, or stiction/actuation rail, serves the aforementioned function of stiction mitigation as well. Like stiction bumps, they may be fabricated on the movable membrane instead.

Another issue that complicates the fabrication of a display based on IMods is the manufacturing of a full-color display. Since different colors in an IMod are achieved by the undriven spacing of the IMod, an array with three different colors will have subarrays of IMods with three different gap sizes. Consequently, there will be three different electromechanical responses for the driving electronics to contend with. The damping holes are one technique for compensating for the variation in electromechanical response from color to color.

Figure 6:
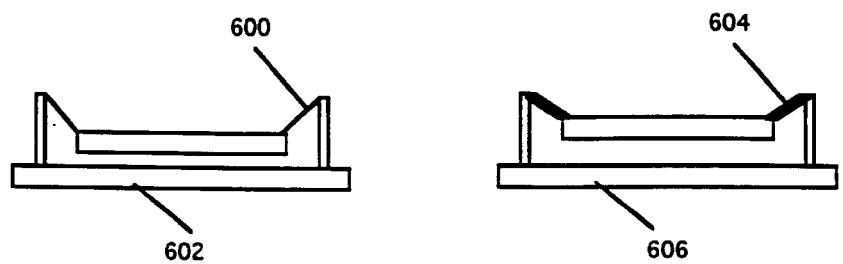
FIG. 6 is a side view of two IMods illustrating a mechanism to alter the spring constant.

Another technique is to vary the thickness of either the membrane, in the double clamped IMod, or the tether thickness in the tether supported IMod. The latter technique is illustrated in FIG. 6. Tether 600 on IMod 602 is fabricated so that it is thinner than tether 604 on IMod 606. With the same bias voltage applied to both, IMod 602 is displaced further than IMod 606 because of its lower spring constant. Less force is required to actuate this structure and its mechanical response time is lower, and it is the mechanical response time that tends to dominate. This effectively changes the overall electromechanical response of the device and thus provides a way to compensate for spacing variation. The same technique applies to the double clamped design only the thickness of the entire membrane, or major parts of it, are varied. By way of example, an IMod that is red and therefore has a longer mechanical response time because of the greater undriven spacing, can be fabricated with a higher spring constant. This makes it possible to match its actuation time to that of, say, the blue IMod.

In the tether supported IMod, the spring constant could be determined by lengths of the tether arms. A longer tether results in a lower spring constant and a shorter tether produces a higher constant. This could be accomplished, in the same amount of total device space, by varying the position along the edge of the movable membrane to which the tether is attached. Thus, a tether connected to the center of the membrane edge would have a lower (a higher) than one connected to the nearer (the farther) end, respectively.

The concept of decoupling the optical properties of the movable membrane from the structural properties was discussed in the previous patent application. The fundamental idea is to fabricate a structure with separate elements designed and optimized to provide the required mechanical and structural characteristics and, independently, the required optical properties.

Figure 7A:
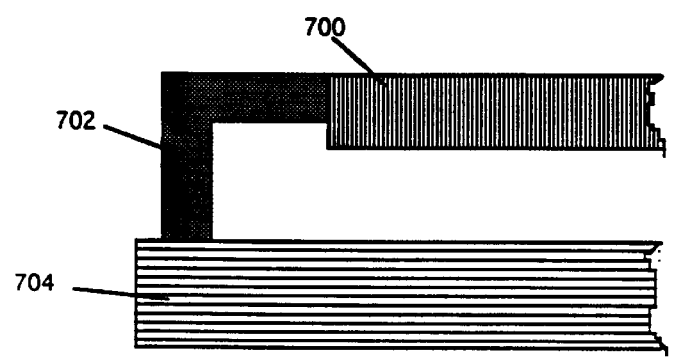
FIG. 7A shows a single material membrane tether support.

FIG. 7A reveals more detail about one possible approach. In this case the movable membrane, 700, is selected purely on the basis of it optical properties and membrane tether, 702, for its advantageous mechanical properties. Aluminum, for example, has already been shown to be useful in several IMod designs from an optical perspective, though mechanically it is subject to fatigue and stress fractures. A more suitable material might be a dielectric like aluminum oxide, silicon oxide or silicon nitride, which could be used to construct the tether.

Figure 7B:
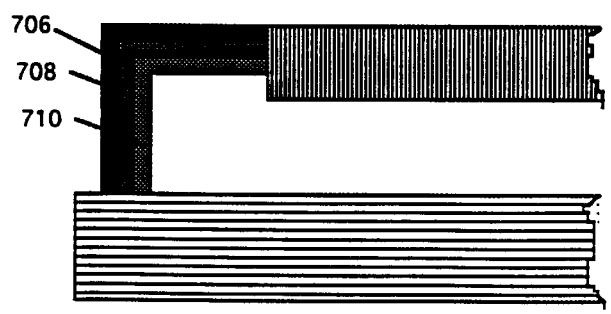
FIG. 7B shows an alloyed or graded material membrane tether support.

FIG. 7B illustrates a variation on the theme where the tether is composed of either a laminated or graded material. In a laminated material, layers 706 and 710 might comprise films of aluminum oxide, providing good mechanical strength, and film 708 could be aluminum, providing electrical conductivity. For a graded material, layers 710–706 could be composed of a continuously varied material that is deposited so that at the inner surface it is pure aluminum, and at the outer surface it is pure aluminum oxide. This approach should be mechanically more robust than the laminate. Other manifestations of this technique are possible, including the use of different materials as well as alternate material variations.

The general fabrication process described in the previous patent applications relies on the concept of surface micromachining, where a sacrificial layer is deposited, a structure is formed on top of it, and the sacrificial layer is etched away. One etch chemistry of particular interest utilizes a gas-phase etchant to remove the sacrificial layer. Candidates include gases known as XeF2, BrF3, ClF3, BrF5, and IF5. These gases have the advantageous property of etching materials such as silicon and tungsten spontaneously, and without the need for a plasma to activate the etch process. Because it is a gas phase etch, as opposed to a wet etch, the sacrificial etch step is much less complicated and provides additional flexibility in the kinds of structural materials which may be used. Furthermore it facilitates the fabrication of more elaborate devices with complex internal structures.

Display applications, in general, require the ability to fabricate on relatively large substrates. While many finished display devices can be smaller than 1 square inch, most direct view displays start at several square inches and can be as large as several hundred square inches or larger. Additionally, these displays utilize glass or plastic substrates that are not found in traditional semiconductor manufacturing plants. MEMS, which are primarily both silicon based and fabricated on silicon substrates, have been historically fabricated in semiconductor type facilities. However the need to fabricate large arrays of MEM devices on large substrates, a need which is exemplified by an IMod based display, cannot be served using traditional semiconductor manufacturing practices or facilities.

Alternatively, there exists a large and growing base of facilities that could also be applied to the manufacture of large arrays of IMods and other MEMS. This manufacturing base comprises facilities and factories that are currently used to manufacture Active Matrix LCDs. The book "Liquid Crystal Flat Panel Displays", by William C. O'Mara, is incorporated herein by reference. These facilities are appropriate because the bulk of the fabrication process is related to the active matrix component, i.e. the thin film transistor (TFT) array that drives the LCD.

While there exist a variety of TFT fabrication processes, they all share several components which make them amenable to the fabrication of large area surface micromachined MEMS. First, the substrate of choice is glass or plastic, which is readily available in large sized formats. In addition, key materials deposited include silicon, tungsten, molybdenum, and tantalum, all of which are suitable sacrificial materials for gas phase etchants, as well as tantalum pentoxide, silicon dioxide, silicon nitride, and aluminum, which are suitable optical, insulating, structural, optical, and conducting materials. In general, all photolithography, process tooling, and testing are oriented towards large arrays and large area devices. Finally, the process for fabricating the TFTs can be utilized to fabricate electronics in conjunction with the MEM devices in order to provide driver circuitry and intelligent logic functions. Thus in conjunction with the gas phase etch, Active Matrix LCD fabs and their associated processes provide a readily usable manufacturing vehicle for IMod based displays in particular, and large area (at least as large of 14"×16") MEM devices in general.

Two general approaches for fabricating TFTs and IMods or other MEM devices can be described as decoupled and overlapping. In the former the requisite TFT based circuitry is fabricated first, and then the IMods are fabricated subsequently. A more efficient approach is to fabricate the TFT array and the IMod array in a way that allows the sharing or overlapping of steps in each process. A representative TFT process sequence is shown in the following:

1. Deposit gate metal (molybdenum or tantalum for example).
2. Pattern gate metal.
3. Deposit insulator and amorphous silicon.
4. Pattern insulator and silicon.
5. Deposit display electrode (aluminum for example).
6. Pattern display electrode.
7. Deposit source/drain/signal line metal (aluminum).
8. Pattern source/drain/signal line.
9. Pattern silicon.
10. Deposit passivation film.

A representative IMod process sequence is shown in the following:

1. Deposit dielectric/primary mirror (molybdenum or tantalum for primary mirror).
2. Pattern primary mirror.
3. Deposit insulator and amorphous silicon.
4. Pattern insulator and silicon.
5. Deposit secondary mirror (aluminum).
6. Pattern secondary mirror.
7. Etch sacrificial material (silicon).

Comparison of these two process sequences reveals that steps 1–6 are functional equivalents on a fundamental level and, obviously, located at the same place in their respective sequences. This similarity benefits both the decoupled and overlapping processes in several ways. First, similarity in materials minimizes the total number of dedicated deposition tools required, as well as the number of etchant chemistries. Second, identical location of equivalent steps streamlines the overall process flow. Finally, for an overlapping process, some of the steps can be shared. The consequence of this is an overall reduction in the total number of process steps required to fabricate both the IMod array and the TFT circuitry, reducing both complexity and cost. In general the process and facilities for manufacturing the active matrix component of the AMLCD would appear to be ideally suited for IMod fabrication.

Any thin film, medium, or substrate (which can be considered a thick film) can be defined in terms of a characteristic optical admittance. By considering only the reflectance, the operation of a thin film can be studied by treating it as an admittance transformer. That is, a think film or combination of thin films (the transformer) can alter the characteristic admittance of another thin film or substrate (the transformed film) upon which it is deposited. In this fashion a normally reflective film or substrate may have it's characteristic admittance altered (i.e., transformed) in such a way that its reflectivity is enhanced and/or degraded by the deposition of, or contact with, a transformer. In general there is always reflection at the interface between any combination of films, mediums, or substrates. The closer the admittance of the two, the lower the reflectance at the interface, to the point where the reflectance is zero when the admittances are matched.

Figure 8:
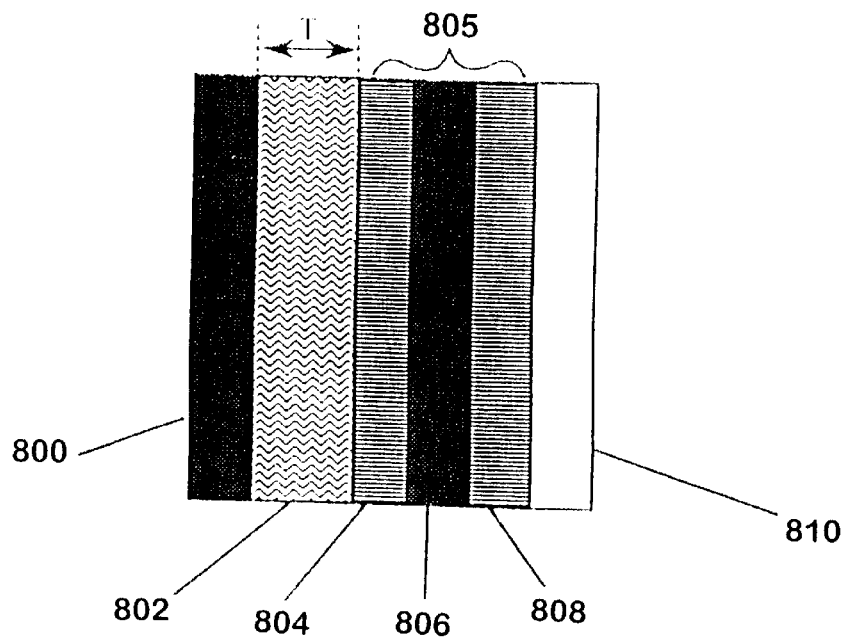
FIG. 8 is a diagram of layers of a modulator.

Referring to FIG. 8, reflector 800 (the transformed film) is separated from induced absorber 805 (the transformer), comprising films 804, 806, and 808, by variable thickness spacer 802. Incident medium 810 bounds the other side of induced absorber 805. Each of these thin films is micromachined in a fashion described in the parent patent application. Induced absorber 805 performs two functions. The first is to match the admittances of reflector 800 and incident medium 810. This is accomplished via matching layer 808, which is used to transform the admittance of absorber 806 to that of the incident medium 810, and via matching layer 804, which is used to transform the admittance of reflector 800 to that of absorber 806. The second function is the absorption of light. This is accomplished using absorber 806, which performs the function of attenuating light which is incident upon it through the medium, as well as light which is incident upon it from the reflector.

Figure 9:
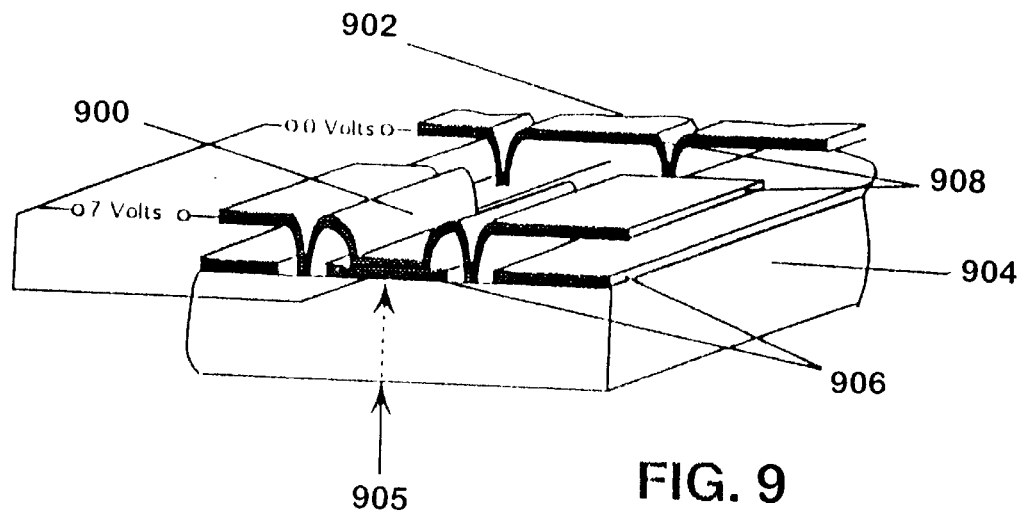
FIG. 9 is a perspective view of cavities in a device.

The ability to alter the thickness T of spacer 802 allows the optical characteristics of the entire structure to be modified. Referring to FIG. 9, pixel 900 is shown in the driven state and pixel 902 in the undriven state. In this case induced absorber 906 (the transformer) resides on substrate 904 and reflector 908 (the transformed film) is a self-supporting structure. Application of a voltage causes reflector 908 to come into contact or close proximity with induced absorber 906. Proper selection of materials and thickness will result in a complete transformation of the admittance of reflector 908 to that of substrate 904. Consequently, a range of frequencies of light 905, which is incident through substrate 904, will be significantly absorbed by the pixel. With no voltage applied, reflector 908 returns to its normal structural state which changes the relative admittances of the reflector and the substrate. In this state (pixel 902) the cavity behaves more like a resonant reflector, strongly reflecting certain frequencies while strongly absorbing others.

Figure 10:
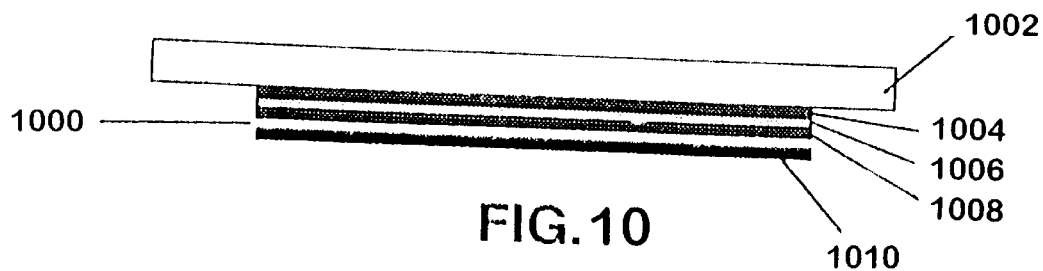
FIG. 10 is a diagram of a side view of a pixel device.
Figure 11:
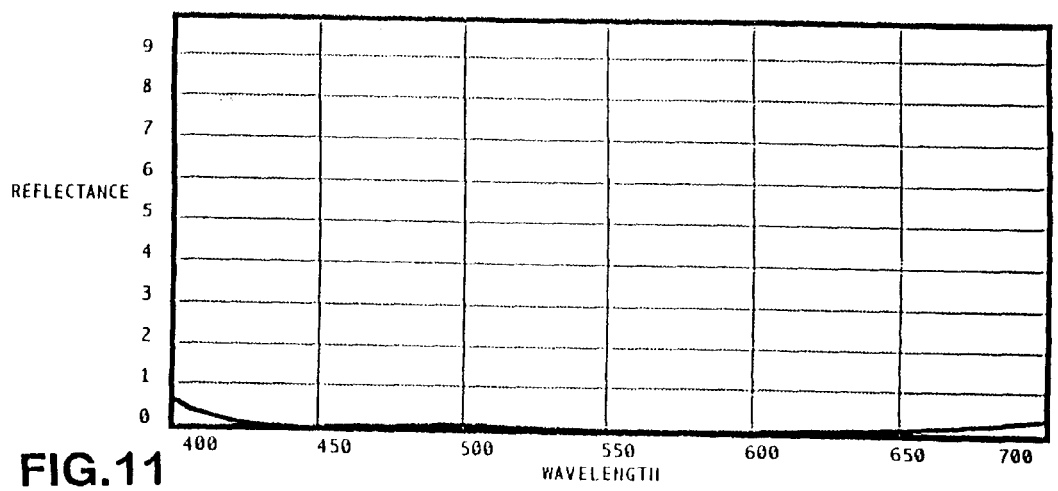
FIG. 11 is a graph of the optical response for a cavity which appears black.
Figure 12:
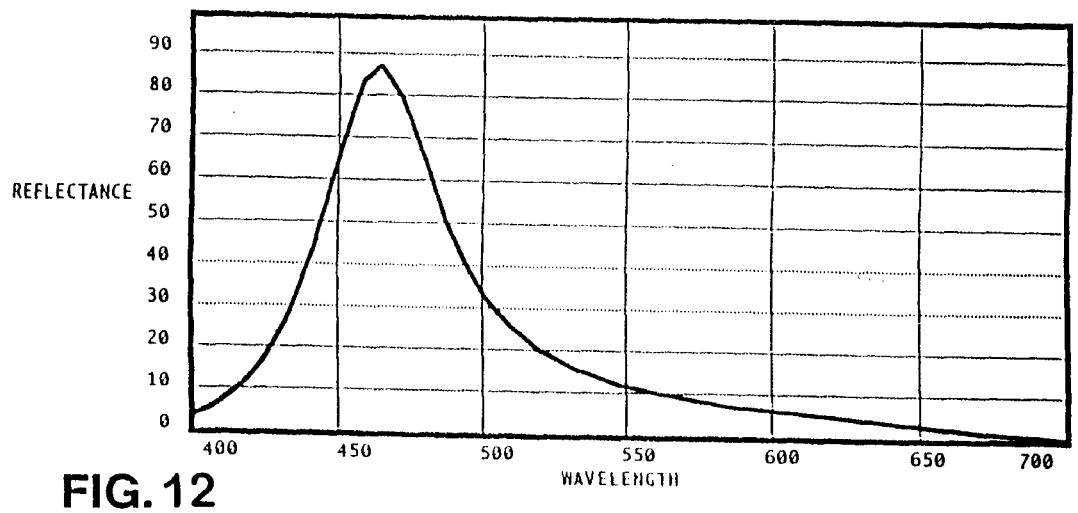
FIG. 12 is a graph of the optical response for a cavity which appears blue.
Figure 13:
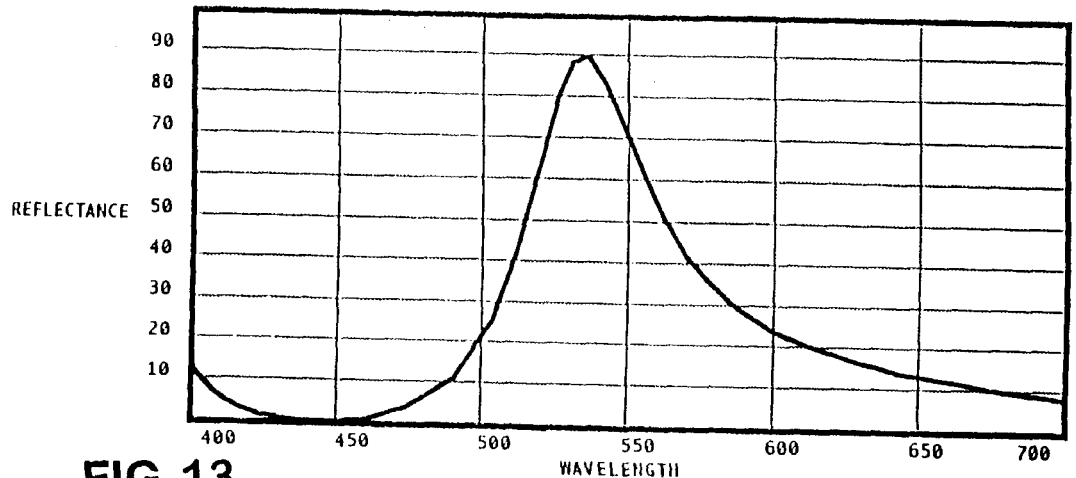
FIG. 13 is a graph of the optical response for a cavity which appears green.
Figure 14:
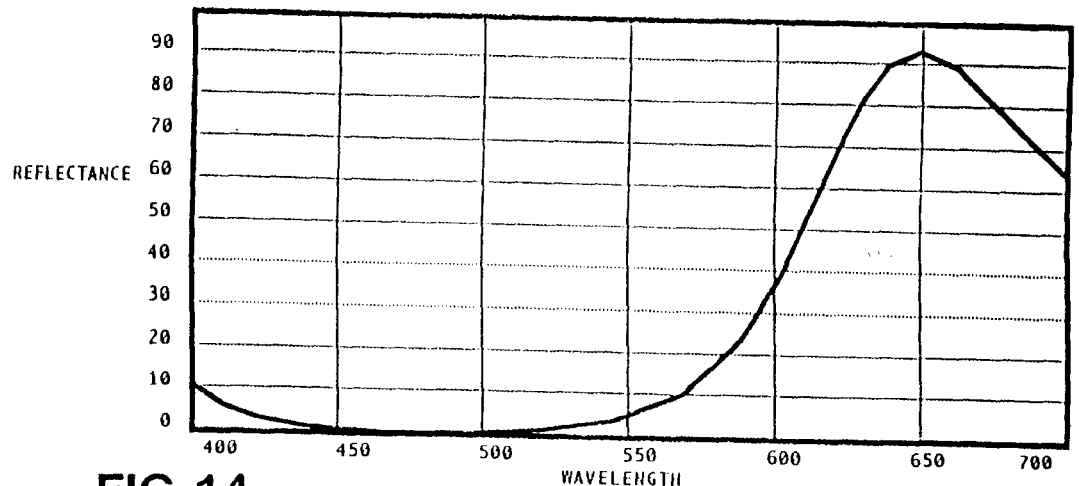
FIG. 14 is a graph of the optical response for a cavity which appears red.
Figure 15:
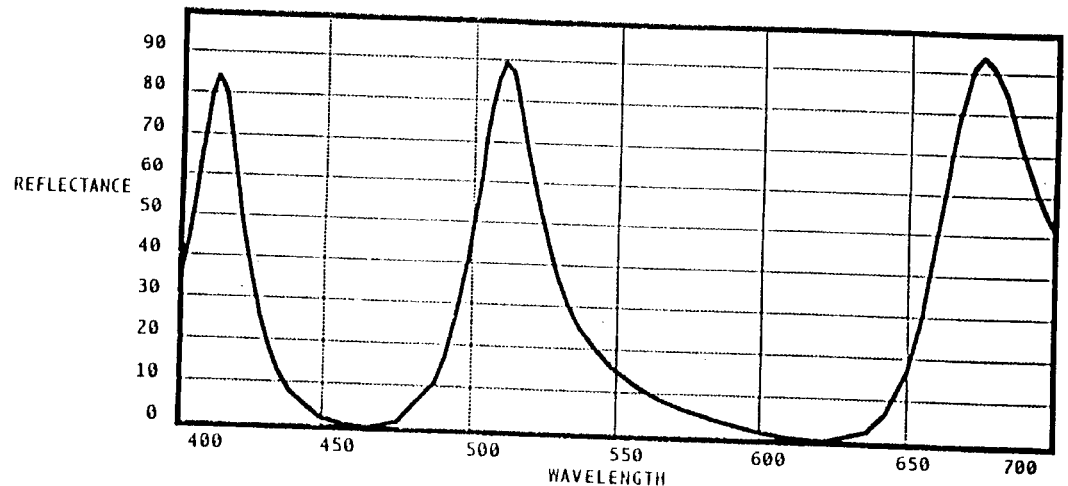
FIG. 15 is a graph of the optical response for a cavity which appears white.

Proper selection of materials thus allows for the fabrication of pixels which can switch from reflecting any color (or combination of colors) to absorbing (e.g., blue to black), or from reflecting any color combination to any other color (e.g., white to red). Referring to FIG. 10, in a specific pixel design, substrate 1002 is glass, matching layer 1004 is a film of zirconium dioxide which is 54.46 nm thick, absorber 1006 is a tungsten film 14.49 nm thick, matching layer 1008 is a film of silicon dioxide 50 nm thick, spacer 1000 is air, and reflector 1010 is a film of silver at least 50 nm thick. Referring to FIG. 1 the optical response of the pixel is shown in the driven state, i.e., when reflector 1010 is in contact with matching layer 1008 resulting in a broad state of induced absorption. Referring to FIGS. 12–15, the different color pixels are shown in respective undriven states which correspond to the reflection of blue, green, red, and white light, respectively. These responses correspond to undriven spacer thicknesses of 325, 435, 230, and 700 nm, respectively.

Figure 16:
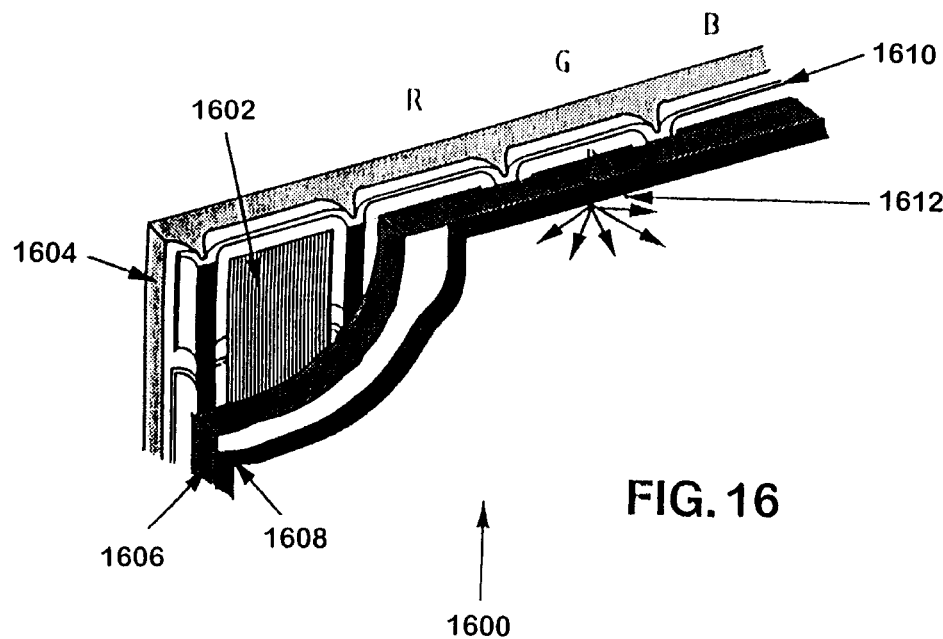
FIG. 16 is a perspective view of a fragment of a reflective flat panel display.

Referring to FIG. 16, a section of full color reflective flat panel display 1600 includes three kinds of pixels, R, G, and B. Each kind differs from the others only in the size of the undriven spacer which is determined during manufacture as described in the parent patent application. Induced absorber 1602 resides on substrate 1606, and reflector 1610 is self-supporting. Monolithic backplate 1604 provides a hermitic seal and can consist a thick organic or inorganic film. Alternatively, the backplate may consist of a separate piece, such as glass, which has been aligned and bonded to the substrate. Electrodes may reside on this backplate so that the electromechanical performance of the pixels may be modified. Incident light 1612 is transmitted through optical compensation mechanism 1608 and substrate 1606 where it is selectively reflected or absorbed by a pixel. The display may be controlled and driven by circuitry of the kind described in the parent patent application.

Optical compensation mechanism 1608 serves two functions in this display. The first is that of mitigating or eliminating the shift in reflected color with respect to the angle of incidence. This is a characteristic of all interference films and can be compensated for by using films with specifically tailored refractive indices or holographic properties, as well as films containing micro-optics; other ways may also be possible. The second function is to supply a supplemental frontlighting source. In this way, additional light can be added to the front of the display when ambient lighting conditions have significantly diminished thus allowing the display to perform in conditions ranging from intense brightness to total darkness. Such a frontlight could be fabricated using patterned organic emitters or edge lighting source coupled to a micro-optic array within the optical compensation film; other ways may also be possible.

The general process for fabrication of the devices is set forth in the parent patent application. Additional details of two alternative ways to fabricate spacers with different sizes are as follows; other ways may also be possible.

Both alternative processes involve the iterative deposition and patterning of a sacrificial spacer material which, in the final step of the larger process is, etched away to form an air-gap.

Figure 17A:
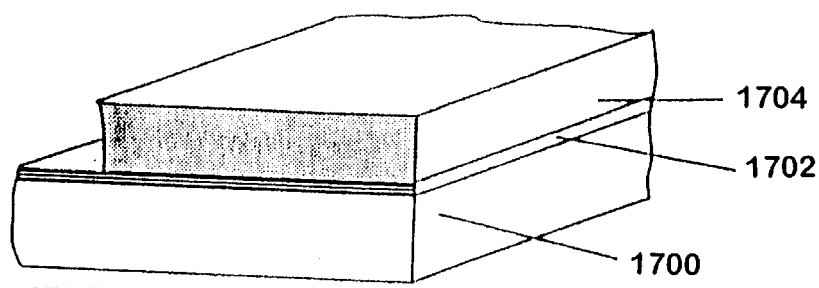
FIGS. 17A, 17B, 17C, and 17D are perspective views of different spacers during fabrication.
Figure 17B:
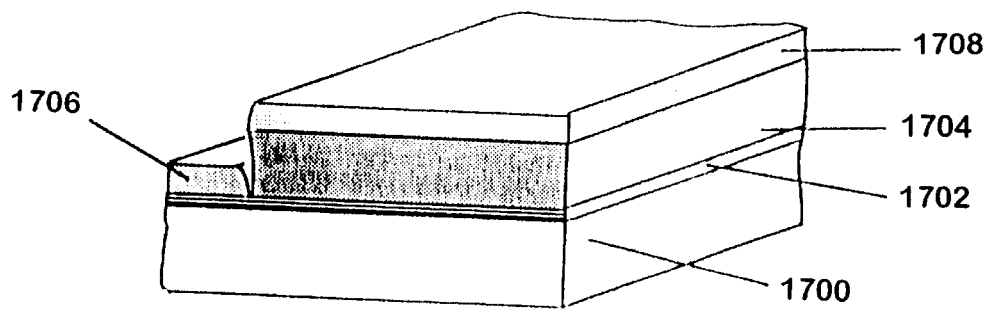
Figure 17C:
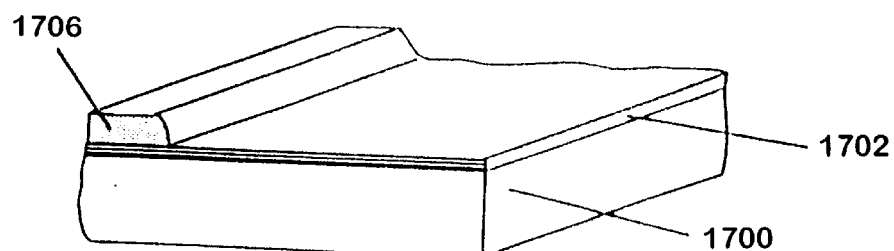
Figure 17D:
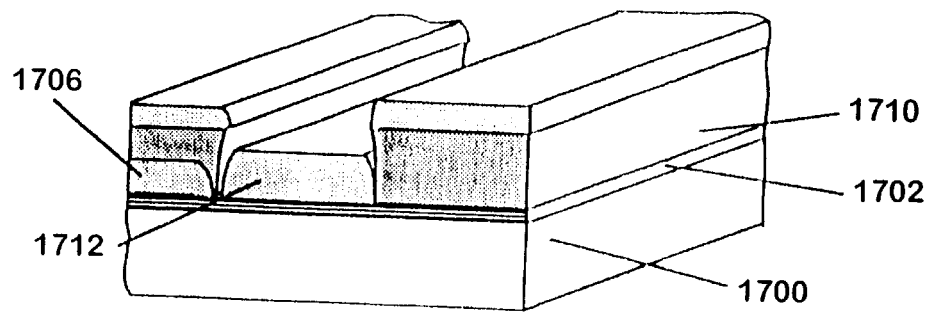

Referring to FIG. 17A, substrate 1700 is shown with induced absorber 1702 already deposited and photoresist 1704 deposited and patterned. Induced absorber 1702 is deposited using any number of techniques for think film deposition including sputtering and e-beam deposition. The photoresist is deposited via spinning, and patterned by overexposure to produce a natural overhang resulting in a stencil. The result is that it may be used to pattern subsequently deposited materials using a procedure known as lift-off. Referring to FIG. 17B, spacer material 1706 has been deposited, resulting in excess spacer material 1708 on top of the stencil. Referring to FIG. 17C, the stencil along with the excess spacer material have been lifted off by immersing the device in a bath of solvent such as acetone and agitating it with ultrasound. Referring to FIG. 17D, the process has begun again with new photoresist 1710 having been deposited patterned in a fashion such that new spacer 1712 is deposited adjacent to the old spacer 1706. Repeating the process once more results in spacers with three different thicknesses. Referring to FIG. 17D, the process has begun again with new photoresist 1710 having been deposited patterned in a fashion such that new spacer 1712, with a different thickness, is deposited adjacent to the old spacer 1706.

Figure 18A:
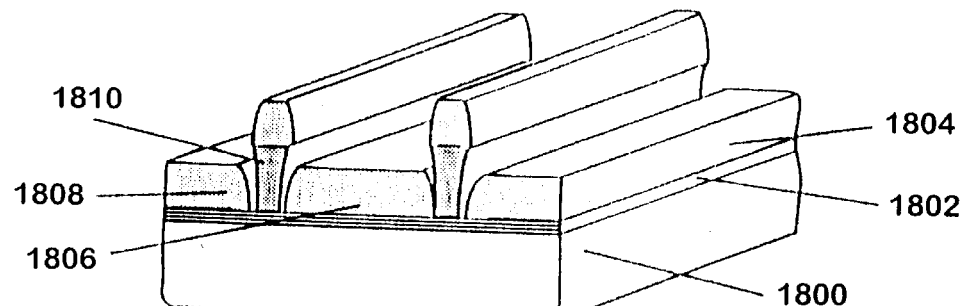
FIGS. 18A, 18B, 18C, and 18D are also perspective views of different spacers during fabrication.
Figure 18B:
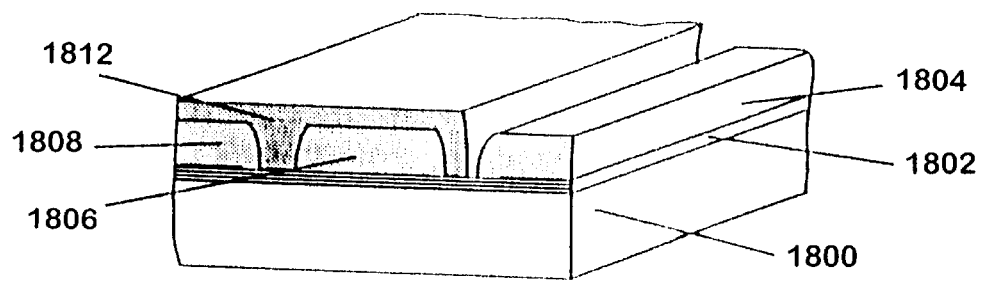
Figure 18C:
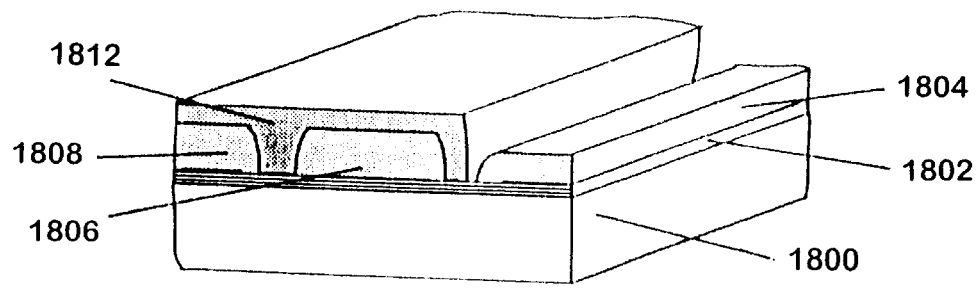
Figure 18D:
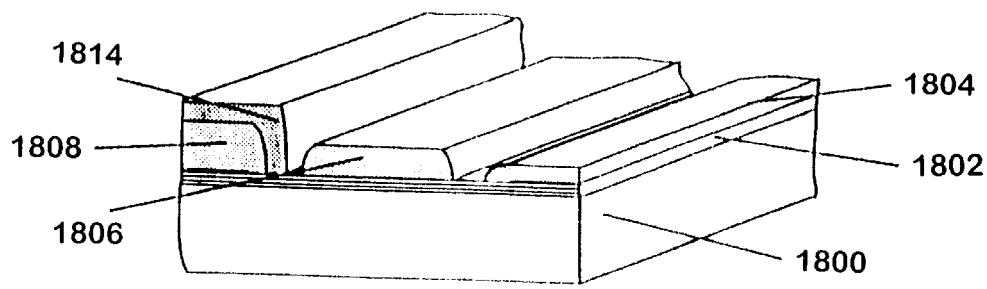

Referring to FIG. 18A, substrate 1800 is shown with induced absorber 1802 already deposited. Spacer materials 1804, 1806, and 1808 have also been deposited and patterned by virtue of lift-off stencil 1810. The spacer materials have a thickness corresponding to the maximum of the three thicknesses required for the pixels. Referring to FIG. 18B, the stencil along with the excess material has been lifted off and new photoresist 1812 has been deposited and patterned such that spacer 1804 has been left exposed. Referring to FIG. 18C, spacer material 1804 has been etched back via one of a number of techniques which include wet chemical etching, and reactive ion etching. Only a portion of the required spacer material is etched away, with the remainder to be etched in a subsequent etch step. Photoresist 1812 is subsequently removed using a similar technique. Referring to FIG. 18D, new photoresist 1814 has been deposited and patterned exposing spacers 1804 and 1806. The entire etch of spacer 1806 is performed in this step, and the etch of spacer 1804 is completed. Photoresist 1814 is subsequently removed and the process is complete.

For example, the spacer material need not ultimately be etched away but may remain instead as a part of the finished device. In this fashion, and using the previously described patterning techniques, arbitrary patterns may be fabricated instead of arrays of simple pixels. Full color static graphical images may thus be rendered in a method which is analogous to a conventional printing process. In conventional printing, an image is broken up into color separations which are basically monochrome graphical subsets of the image, which correspond to the different colors represented, i.e., a red separation, a blue separation, a green separation, and a black separation. The full-color image is produced by printing each separation using a different colored ink on the same area.

Alternatively, in a process which we will call "Iridescent Printing", the different separations are composed of layers of thin films which correspond to the IMod design described here and those in the referenced patent. Patterning or printing a combination of colors or separations on the same area, allows for brilliant full-color images to be produced.

Figure 19A:
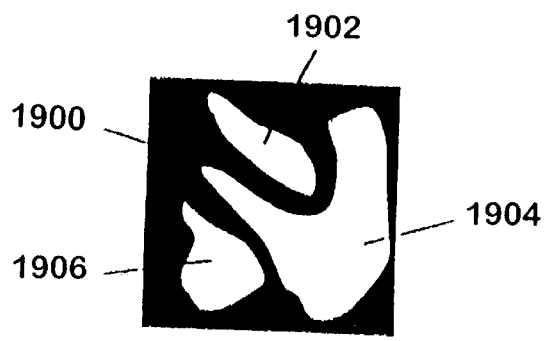
FIGS. 19A, 19B, 19C, 19D are top views of a static graphic image.
Figure 19B:
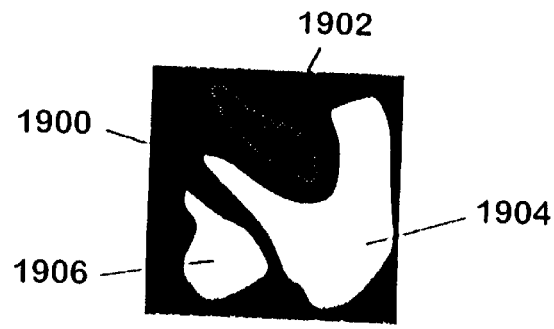
Figure 19C:
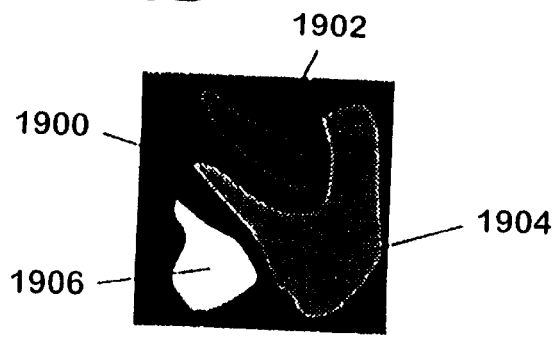
Figure 19D:
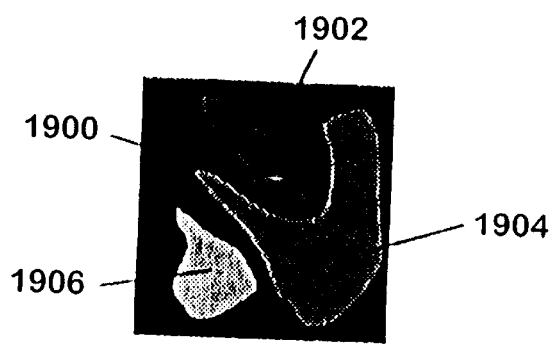

Referring to FIG. 19A, a square substrate is shown with area 1900 representing the portion of the substrate which has been patterned with a thin film stack optimized for black. Referring to FIG. 19B, the substrate has been subsequently patterned with a thin film stack optimized for red in area 1902. Referring to FIG. 19C, the substrate has been subsequently patterned with a thin film stack optimized for green in area 1904. Referring to FIG. 19D, the substrate has been subsequently patterned with a think film stack optimized for blue in area 1906.

Alternatively, a simpler process can be obtained if only the induced absorber design is used. In this process, the entire substrate is first coated with the induced absorber stack. Subsequent steps are then used to pattern the spacer material only, using the aforementioned techniques. After the desired spacers, i.e., colors are defined, a final deposition of a reflector is performed.

The brightness of different colors can be altered by varying the amount of black interspersed with the particular color, i.e., spatial dithering. The images also exhibit the pleasing shift of color with respect to viewing angle known as iridescence.

In another example, a reflective flat panel display may also be fabricated using a single kind of pixel instead of three. Multiple colors, in this case, are obtained through fabricating the pixels in the form of continuously tunable or analog interferometric modulators as described in the parent patent application. In this fashion, any individual pixel may, by the application of the appropriate voltage, be tuned to reflect any specific color. This would require that the array be fabricated on a substrate along with electronic circuitry, or directly on the surface of an integrated circuit, in order to provide a charge storage mechanism. This approach, though it requires a more complicated driving scheme relying on analog voltages, provides superior resolution. It would also find application in a projection system.

Other embodiments are within the scope of the following claims.

What is claimed is:

1. An array of interferometric modulators, each of the interferometric modulators comprising a cavity defined by two walls, at least two arms connecting the two walls to permit motion of the walls relative to each other, the walls and arms of different ones of the modulators being configured to achieve different spring constants associated with motion of the walls relative to each other.

2. The modulator of claim 1, in which each of the arms has two ends, one of the ends attached to the first wall and a second end that is attached at a point that is fixed relative to a second one of the walls, the point of attachment of the second end being offset, with reference to an axis that is perpendicular to the first wall, from the end that is attached to the second wall.

3. An interferometric modulator comprising three walls that are generally parallel to one another, the walls being supported for movement of at least one of the walls relative to the other two, and control circuitry for driving at least one of the walls to discrete positions representing three discrete states of operation of the modulator.

4. The modulator of claim 3, in which in one of the three discrete states, there is a gap between the first and a second of the two walls and a gap between the second and a third of the two walls, in a second of the three discrete states, there is a gap between the first and the second of the two walls and no gap between the second and the third of the two walls, and in the third of the three discrete states, there is no gap between the first and the second of the two walls and no gap between the second and the third of the two walls.

5. The modulator of claim 3, in which each membrane comprises a combination of dielectric, metallic, or semiconducting films.

6. An interference interferometric modulator comprising a cavity defined by two walls that are movable relative to one another to and from a contact position in which the two walls are essentially adjacent to one another, and spacers mounted to form part of one of the walls to reduce the surface area over which the two walls touch in the contact position.

7. The modulator of claim 6, in which the spacers comprise electrodes and further comprising conductors to feed current to the electrodes.

8. An interference interferometric modulator comprising at least two walls that are movable relative to each other to define a cavity between them, the relative positions of the walls defining two modes, one in which the modulator reflects incident light and appears white and another in which the modulator absorbs incident light and appears black.

9. The modulator of claim 8 in which one of the walls comprises a sandwich of a dielectric between metals, and the other of the walls comprises a dielectric.

10. An interferometric modulator comprising a cavity defined by two walls held by a support comprising two materials such that the electrical or mechanical properties of the mechanical support differ at different locations in a cross-section of the mechanical support.

11. The modulator of claim 10, in which the support comprises a laminate of two or more discrete materials.

12. The modulator of claim 10, in which the support comprises or a gradient of two or more materials.

13. The modulator of claim 10, in which the two materials exhibit respectively different and complementary electrical, mechanical, or optical properties.

14. An interference modulation device comprising:
   a plurality of interference modulators fabricated in an array, each interference modulator comprising first and second walls that cooperate to interferometrically modulate light to produce first and second optical responses; and
   a mounting arrangement mounting the second wall relative to the first wall so that the second wall is spaced from the first wall corresponding to an undriven condition in which the first optical response is produced, the mounting arrangement allowing displacement of the second wall towards the first wall corresponding to a driven condition in which the second optical response is produced, wherein the mounting arrangement allows for movement of the second wall when it is in the undriven condition thereby to relieve residual stress in the second wall.

15. The interference modulation device of claim 14, wherein the movement of the second wall is generally within a plane of the second wall.

16. The interference modulation device of claim 14, wherein the mounting arrangement comprises arms to support the second wall, the arms having a spring constant to allow the movement of the second wall to reduce residual stress therein.

17. An interferometric modulator comprising:
   first and second walls which cooperate to interferometrically modulate light in a first operative position in which the walls are spaced apart by a gap and in a second operative position in which the position in which the walls are displaced to close the gap; and
   an actuation mechanism comprising an electrode to electrostatically displace the second wall from the first operative position to the second operative position, the electrode having a reduced surface area so as to reduce charge build-up through contact with the second wall in the second operative position.

18. The interferometric modulator of claim 17, wherein the actuation mechanism further comprises a mechanism to reverse a polarity of a driving voltage applied to the electrode for each successive actuation of the electrode.

19. The interferometric modulator of claim 17, wherein the electrode comprises two spaced apart rails.

* * * * *

UNITED STATES PATENT AND TRADEMARK OFFICE
CERTIFICATE OF CORRECTION

PATENT NO. : 6,867,896 B2  Page 1 of 1
APPLICATION NO. : 09/966843
DATED : March 15, 2005
INVENTOR(S) : Mark W. Miles It is certified that error appears in the above-identified patent and that said Letters Patent is hereby corrected as shown below:

On the front page of the patent after field (60), please delete the following:
"Division of application No. 09/056,975, filed on Apr. 8, 1998, which is a continuation-in-part of application No. 08/769,947, filed on Dec. 19, 1996, now abandoned, which is a continuation-in-part of application No. 08/554,630, filed on Nov. 6, 1995, now abandoned, which is a continuation-in-part of application No. 08/238,750, filed on May 5, 1994, now Pat. No. 5,835,255."

And insert the following on the front page of the patent after field (60):
--This application is a divisional of U.S. patent application No. 09/056,975, filed Apr. 8, 1998 (now U.S. Pat. No. 6,674,562), which is a continuation-in-part of (1) U.S. patent application No. 08/769,947, filed Dec. 19, 1996 (now abandoned), (2) U.S. patent application No. 08/554,630, filed Nov. 6, 1995 (now abandoned), and (3) U.S. patent application No. 08/238,750, filed May 5, 1994 (now U.S. Pat. No. 5,835,255). --

Signed and Sealed this

Twenty-second Day of August, 2006

JON W. DUDAS
*Director of the United States Patent and Trademark Office*